(12) United States Patent
Li et al.

(10) Patent No.: US 11,658,475 B1
(45) Date of Patent: May 23, 2023

(54) LEAKAGE CURRENT DETECTION AND INTERRUPTION DEVICE, ELECTRICAL CONNECTOR AND ELECTRICAL APPLIANCE

(71) Applicant: Chengli Li, Suzhou (CN)

(72) Inventors: Chengli Li, Suzhou (CN); Long Chen, Suzhou (CN)

(73) Assignee: Chengli Li, Suzhou (CN)

( * ) Notice: Subject to any disclaimer, the term of this patent is extended or adjusted under 35 U.S.C. 154(b) by 24 days.

(21) Appl. No.: 17/558,357

(22) Filed: Dec. 21, 2021

(30) Foreign Application Priority Data

Dec. 20, 2021 (CN) .......................... 202111558732.9
Dec. 20, 2021 (CN) .......................... 202123197790.1

(51) Int. Cl.
*H02H 3/16* (2006.01)
*H02H 1/00* (2006.01)

(52) U.S. Cl.
CPC ............ *H02H 3/16* (2013.01); *H02H 1/0007* (2013.01)

(58) Field of Classification Search
CPC . G01R 31/52; H02H 3/16; H02H 3/32; H02H 1/00; H02H 1/0007; H02H 1/06
See application file for complete search history.

(56) References Cited

U.S. PATENT DOCUMENTS

| 8,436,739 | B2 | 5/2013 | Elms et al. |
| 9,312,680 | B2 | 4/2016 | Li et al. |
| 9,906,014 | B2 | 2/2018 | Gao et al. |
| 10,571,526 | B2* | 2/2020 | Li .......................... H02H 3/338 |
| 10,615,588 | B2* | 4/2020 | Li ............................ H01H 9/54 |
| 11,018,496 | B2 | 5/2021 | Li et al. |
| 11,444,448 | B2* | 9/2022 | Li .......................... H02H 3/335 |
| 11,600,984 | B1* | 3/2023 | Li .......................... H02H 7/228 |
| 2008/0225448 | A1 | 9/2008 | Li et al. |
| 2016/0252557 | A1* | 9/2016 | Li .......................... H02H 3/335 324/509 |
| 2016/0363627 | A1 | 12/2016 | Epee |
| 2018/0109102 | A1 | 4/2018 | Li et al. |
| 2018/0149690 | A1 | 5/2018 | Li et al. |
| 2021/0111554 | A1 | 4/2021 | Li et al. |
| 2021/0265832 | A1 | 8/2021 | Li et al. |
| 2021/0313796 | A1 | 10/2021 | Li et al. |

* cited by examiner

*Primary Examiner* — Jared Fureman
*Assistant Examiner* — Nicolas Bellido
(74) *Attorney, Agent, or Firm* — Chen Yoshimura LLP (57) ABSTRACT

A leakage current detection and interruption device coupled to power supply lines, including a leakage current detection module for generating a leakage current fault signal when detecting leakage currents on the lines; a trip drive module responsive to the leakage current fault signal to drive a switch to disconnect power on the lines, the trip drive module including a first semiconductor device responsive to the leakage current fault signal to cause a current in a first coil to drive the switch; a coil function detection module for generating a coil fault signal when detecting a fault in the first coil; a self-test module for generating a self-test fault signal when detecting a fault in the leakage current detection module or the first semiconductor device; and a detection drive module for driving the switch to disconnect power in response to the coil fault signal or the self-test fault signal.

16 Claims, 6 Drawing Sheets

LEAKAGE CURRENT DETECTION AND INTERRUPTION DEVICE, ELECTRICAL CONNECTOR AND ELECTRICAL APPLIANCE

BACKGROUND OF THE INVENTION

Field of the Invention

This invention relates to electrical circuits, and in particular, it relates to a leakage current detection and interruption device with self-testing functions, and related electrical connectors and electrical appliances.

Description of Related Art

Electrical appliances are widely used in homes and industries. For safety, leakage current detection and interruption device are typically installed at output ends of electrical grids or input ends of home appliances. Such devices are typically labeled with warnings such as "test before use" to remind users to test whether the leakage current detection and interruption device is functioning normally. In practice, however, due to varying use environments of installation factors, even if the user tested the device before use, it is still possible for the device to lose its protection function during use, which can be dangerous.

To reduce such risk, many current leakage current detection and interruption devices are designed to have both a leakage current detection function and a self-testing function. However, in many such leakage current detection and interruption devices with self-testing function, when the trip coil or semiconductor device (e.g. silicon-controlled rectifier, SCR) of the main detection circuit is faulty, the device can only generate audible or visible alarms; if the user cannot immediately become aware of such malfunction and stop using the device, there is still a safety threat.

SUMMARY

To solve the above problems, embodiments of the present invention provide a leakage current detection and interruption device which can interrupt the power connection when the trip coil or semiconductor device of the main circuit is faulty, without manual intervention by the user. This enhances convenience and safety of the device.

In a first aspect, the present invention provides a leakage current detection and interruption device, which includes: a switch module, coupled between an input end and an output end of a plurality of power supply lines, configured to control electrical connection between the input end and the output end; a leakage current detection module, configured to detect a leakage current on the power supply lines, and to generate a leakage current fault signal in response to detecting a leakage current; a trip drive module, configured to drive the switch module to electrically disconnect the output end from the input end in response to the leakage current fault signal, the trip drive module including: a first coil, configured to generate an electromagnetic force to drive the switch module; and a first semiconductor device, coupled in series with the first coil, configured to cause the first coil to generate the electromagnetic force in response to the leakage current fault signal; a coil function detection module, configured to detect a fault condition in the first coil, and to generate a coil fault signal in response to detecting the fault condition in the first coil; a self-test module, configured to detect a fault condition in the leakage current detection module and/or the first semiconductor device, and to generate a self-test fault signal in response to detecting the fault condition; and a detection drive module, configured to drive the switch module to electrically disconnect the output end from the input end in response to the coil fault signal and/or the self-test fault signal.

In some embodiments, the detection drive module includes: a second coil, configured to generate another electromagnetic force to drive the switch module; and a second semiconductor device, coupled in series with the second coil, configured to cause the second coil to generate the other electromagnetic force in response to the coil fault signal or the self-test fault signal.

In some embodiments, each of the first semiconductor device and the second semiconductor device is selected from a group consisting of: silicon controlled rectifiers, bipolar junction transistors, field-effect transistors, and photoelectric coupling elements.

In some embodiments, the coil function detection module includes: a third semiconductor device, its control electrode being coupled to the first coil, and its first electrode being coupled to the detection drive module; and a first resistor, its one end being coupled to the input end of the power supply lines, its other end being coupled to the first electrode of the third semiconductor device, wherein when the first coil has a fault, the coil function detection module generates the coil fault signal via the first resistor.

In some embodiments, each of the first semiconductor device and the third semiconductor device is selected from a group consisting of: silicon controlled rectifiers, bipolar junction transistors, field-effect transistors, and photoelectric coupling elements.

In some embodiments, the self-test module includes: a simulated leakage current triggering module, coupled to the first semiconductor device, configured to generate a simulated leakage current trigger signal, wherein the first semiconductor device is configured to turn off the simulated leakage current trigger signal in response to the leakage current fault signal; a simulated leakage current generating module, configured to generate a simulated leakage current signal in response to the simulated leakage current trigger signal; and a fault signal generating module, coupled to the simulated leakage current triggering module, configured to generate the self-test fault signal in response to the fault in the leakage current detection module and/or the first semiconductor device.

In some embodiments, the simulated leakage current triggering module includes: a trigger device, configured to generate a simulated leakage current trigger signal when it is conductive; and a second resistor and a first capacitor, coupled in series and coupled to the trigger device, wherein the second resistor and the first capacitor are configured to control the trigger device to become conductive, wherein the first semiconductor device becomes conductive in response to the leakage current fault signal, and the first capacitor discharges via the first semiconductor device to turn off the simulated leakage current trigger signal.

In a second aspect, the present invention provides a leakage current detection and interruption device, which includes: a switch module, coupled between an input end and an output end of a plurality of power supply lines, configured to control electrical connection between the input end and the output end; a leakage current detection module, configured to detect a leakage current on the power supply lines, and to generate a leakage current fault signal in response to detecting a leakage current; a trip drive module, configured to drive the switch module to electrically disconnect the output end from the input end in response to the leakage current fault signal, the trip drive module including: a first coil, configured to generate an electromagnetic force to drive the switch module; and a first semiconductor device, coupled in series with the first coil, configured to cause the first coil to generate the electromagnetic force in response to the leakage current fault signal; a self-test module, configured to detect a fault condition in the leakage current detection module, the first coil, and/or the first semiconductor device, and to generate a self-test fault signal in response to detecting the fault condition; and a detection drive module, configured to drive the switch module to electrically disconnect the output end from the input end in response to the self-test fault signal.

In some embodiments, the detection drive module includes: a second coil, configured to generate another electromagnetic force to drive the switch module; and a second semiconductor device, coupled in series with the second coil, configured to cause the second coil to generate the other electromagnetic force in response to the self-test fault signal.

In some embodiments, each of the first semiconductor device and the second semiconductor device is selected from a group consisting of: silicon controlled rectifiers, bipolar junction transistors, field-effect transistors, and photoelectric coupling elements.

In some embodiments, the self-test module includes: a simulated leakage current triggering module, coupled to the first coil and the first semiconductor device, configured to generate a simulated leakage current trigger signal, wherein the first coil and the first semiconductor device are configured to turn off the simulated leakage current trigger signal in response to the leakage current fault signal; a simulated leakage current generating module, configured to generate a simulated leakage current signal in response to the simulated leakage current trigger signal; and a fault signal generating module, coupled to the simulated leakage current triggering module, configured to generate the self-test fault signal in response to the fault in the leakage current detection module, the first coil, and/or the first semiconductor device.

In some embodiments, the simulated leakage current triggering module includes: a trigger device, configured to generate a simulated leakage current trigger signal when it is conductive; and a second resistor and a first capacitor, coupled in series and coupled to the trigger device, wherein the second resistor and the first capacitor are configured to control the trigger device to become conductive, wherein the first semiconductor device becomes conductive in response to the leakage current fault signal, and the first capacitor discharges via a path formed by the serial-coupled first coil and first semiconductor device to turn off the simulated leakage current trigger signal.

In a third aspect, the present invention provides an electrical power connection device, which includes a body, and a leakage current detection and interruption device according to any of the first and second aspects and various embodiments, disposed inside the body.

In a fourth aspect, the present invention provides an electrical appliance, which includes an electrical load, and an electrical power connection device coupled between a power supply and the load to supply power to the load, wherein the electrical power connection device includes a leakage current detection and interruption device according to any of the first and second aspects and various embodiments.

The leakage current detection and interruption device according to various embodiments of the present invention can interrupt the power connection when the trip coil or semiconductor device of the main circuit is faulty, without manual intervention by the user. This enhances convenience and safety of the device.

BRIEF DESCRIPTION OF THE DRAWINGS

Preferred embodiments of the present invention are described with reference to the drawings. These drawings explain the embodiments and their operating principle, and only illustrate structures that are necessary to the understanding of the invention. These drawings are not to scale. In the drawings, like features are designated by like reference symbols. In the block diagrams, lines between blocks represent electrical or magnetic coupling of the blocks; the absence of lines between blocks does not mean the lack of coupling.

DETAILED DESCRIPTION OF PREFERRED EMBODIMENTS

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

Before describing the embodiments, some terms used in this disclosure are defined here to help the reader better understand this disclosure. In this disclosure, a transistor may be of any type and structure, such as field-effect transistor (FET) including metal-oxide-semiconductor field-effect transistor (MOSFET), bipolar junction transistor (BJT), silicon controlled rectifier (SCR), etc. When the transistor is a FET, the control electrode refers to the gate of the FET, the first electrode may be the drain or source of the FET, and the corresponding second electrode may be the source or drain of the FET. When the transistor is a BJT, the control electrode refers to the base of the BJT, the first electrode may be the collector or emitter of the BJT, and the corresponding second electrode may be the emitter or collector of the BJT. When the transistor is an SCR, the control electrode refers to the control electrode G of the SCR, the first electrode may be the anode, and the corresponding second electrode may be the cathode. A simulated leakage current signal is a periodic signal generated by the self-test module. Because it has a relatively short duration, although the leakage current detection module can detect the simulated leakage current signal, it will not cause the device to trip and interrupt the power connection.

Embodiments of the present invention provide a leakage current detection and interruption device which can interrupt the power connection when the trip coil or semiconductor device of the main circuit is faulty, without the user's manual intervention. This enhances convenience and safety of the device.

Figure 1:
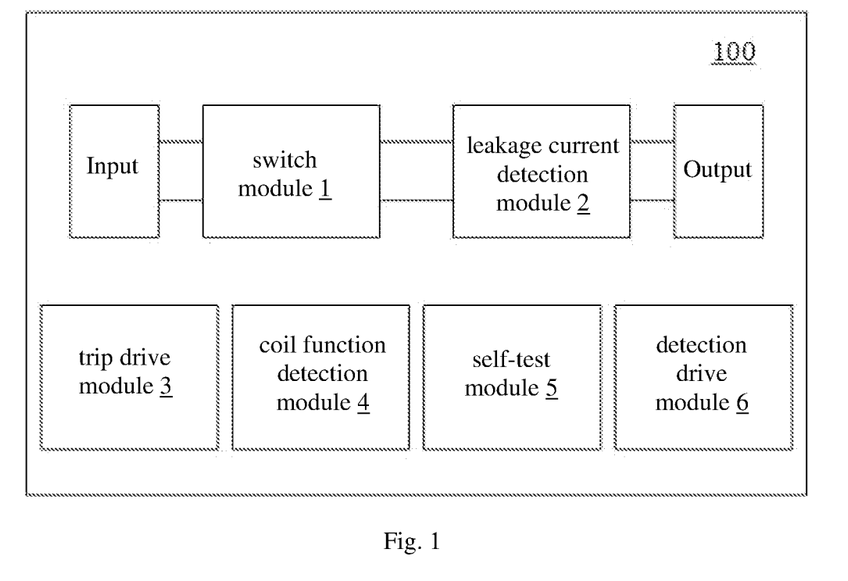
FIG. 1 is a block diagram of a leakage current detection and interruption device according to embodiments of the present invention.

FIG. 1 is a block diagram of a leakage current detection and interruption device according to embodiments of the present invention.

As shown in FIG. 1, the leakage current detection and interruption device 100 includes a switch module 1, a leakage current detection module 2, a trip drive module 3, a coil function detection module 4, a self-test module 5, and a detection drive module 6. The switch module 1 includes a switch coupled between the input end and output end of the power supply lines, configured to control the electrical connection between the input end and the output end. The leakage current detection module 2 is coupled between the input end and the output end, configured to detect a leakage current on the power supply lines, and to generate a leakage current fault signal in response to detecting a leakage current. The trip drive module 3 is configured to drive the switch module 1 to electrically disconnect the input and output ends in response to the leakage current fault signal. The trip drive module 3 includes a first coil and a first semiconductor device. The first semiconductor device is coupled in series with the first coil, and becomes conductive in response to the leakage current fault signal. As a result, a current flows through the first coil, generating an electromagnetic force to drive the switch module 1 to disconnect the output end. The coil function detection module 4 is configured to detect a fault condition in the first coil, and to generate a coil fault signal in response to detecting the fault condition in the first coil. The self-test module 5 is coupled to the leakage current detection module 2 and the first semiconductor device, configured to periodically generate a simulated leakage current signal, in order to detect whether a fault condition exists in the leakage current detection module 2 or the first semiconductor device. In response to detecting a fault condition in either the leakage current detection module 2 or the first semiconductor device, the self-test module 5 generates a self-test fault signal. The detection drive module 6 drives the switch module 1 to electrically disconnect the output end in response to the coil fault signal and/or the self-test fault signal.

To summarize, in the embodiment of FIG. 1, the coil function detection module 4 detects a fault in the first coil of the trip drive module 3 (i.e., the trip coil of the main circuit), and generates a coil fault signal in response to detecting such a fault. The self-test module 5 detects a fault in the first semiconductor device of the trip drive module 3 (i.e., the semiconductor device of the main circuit), and generates a self-test fault signal in response to detecting such a fault. In response to the coil fault signal and/or the self-test fault signal, the switch module 1 disconnects the output end, thereby eliminating the safety threat.

Figure 2:
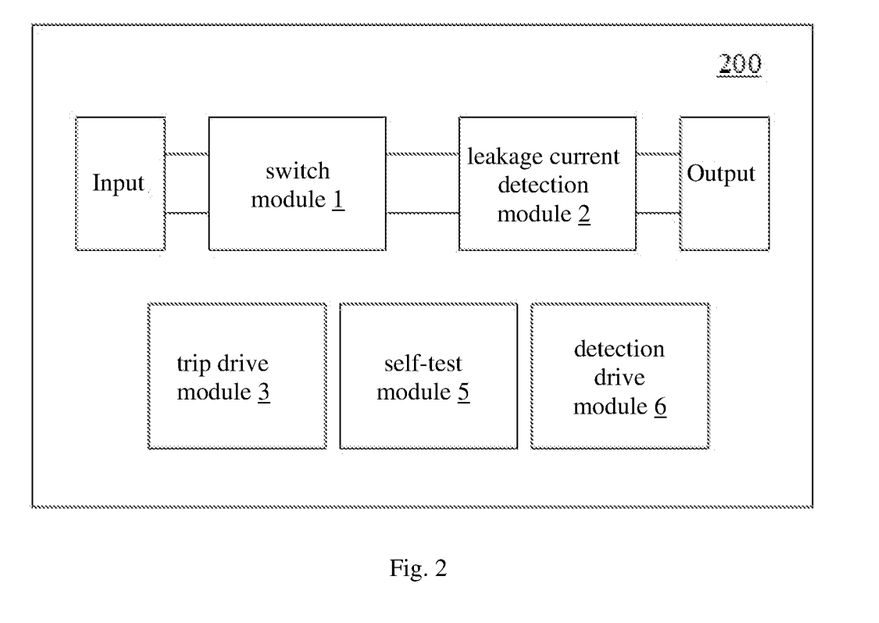
FIG. 2 is a block diagram of a leakage current detection and interruption device according to other embodiments of the present invention.

FIG. 2 is a block diagram of a leakage current detection and interruption device according to other embodiments of the present invention.

As shown in FIG. 2, the leakage current detection and interruption device 200 includes a switch module 1, a leakage current detection module 2, a trip drive module 3, a self-test module 5 and a detection drive module 6. The switch module 1 is coupled between the input end and output end of the power supply lines, and configured to control the electrical connection between the input end and the output end. The leakage current detection module 2 is coupled between the input end and the output end, configured to detect a leakage current on the power supply lines, and to generate a leakage current fault signal in response to detecting a leakage current. The trip drive module 3 is configured to drive the switch module 1 to electrically disconnect the input and the output ends in response to the leakage current fault signal. The trip drive module 3 includes a first coil and a first semiconductor device. The first semiconductor device is coupled in series with the first coil, and becomes conductive in response to the leakage current fault signal. As a result, a current flows through the first coil, generating an electromagnetic force to drive the switch module 1 to disconnect the output end. The self-test module 5 is coupled to the leakage current detection module 2, the first coil and the first semiconductor device, configured to periodically generate a simulated leakage current signal, in order to detect a fault condition in the leakage current detection module 2 or the first coil or the first semiconductor device. In response to detecting a fault condition in any one or more of the leakage current detection module 2, the first coil and the first semiconductor device, the self-test module 5 generates a self-test fault signal. The detection drive module 6 drives the switch module 1 to electrically disconnect the output end in response to the self-test fault signal.

To summarize, in the embodiment of FIG. 2, the self-test module 5 detects a fault in the first coil of the trip drive module 3 (i.e., the trip coil of the main circuit) and/or the first semiconductor device of the trip drive module 3 (i.e., the semiconductor device of the main circuit), and generates a self-test fault signal in response to detecting such faults. In response to the self-test fault signal, the switch module 1 electrically disconnects the output end, thereby eliminating the safety threat.

Figure 3:
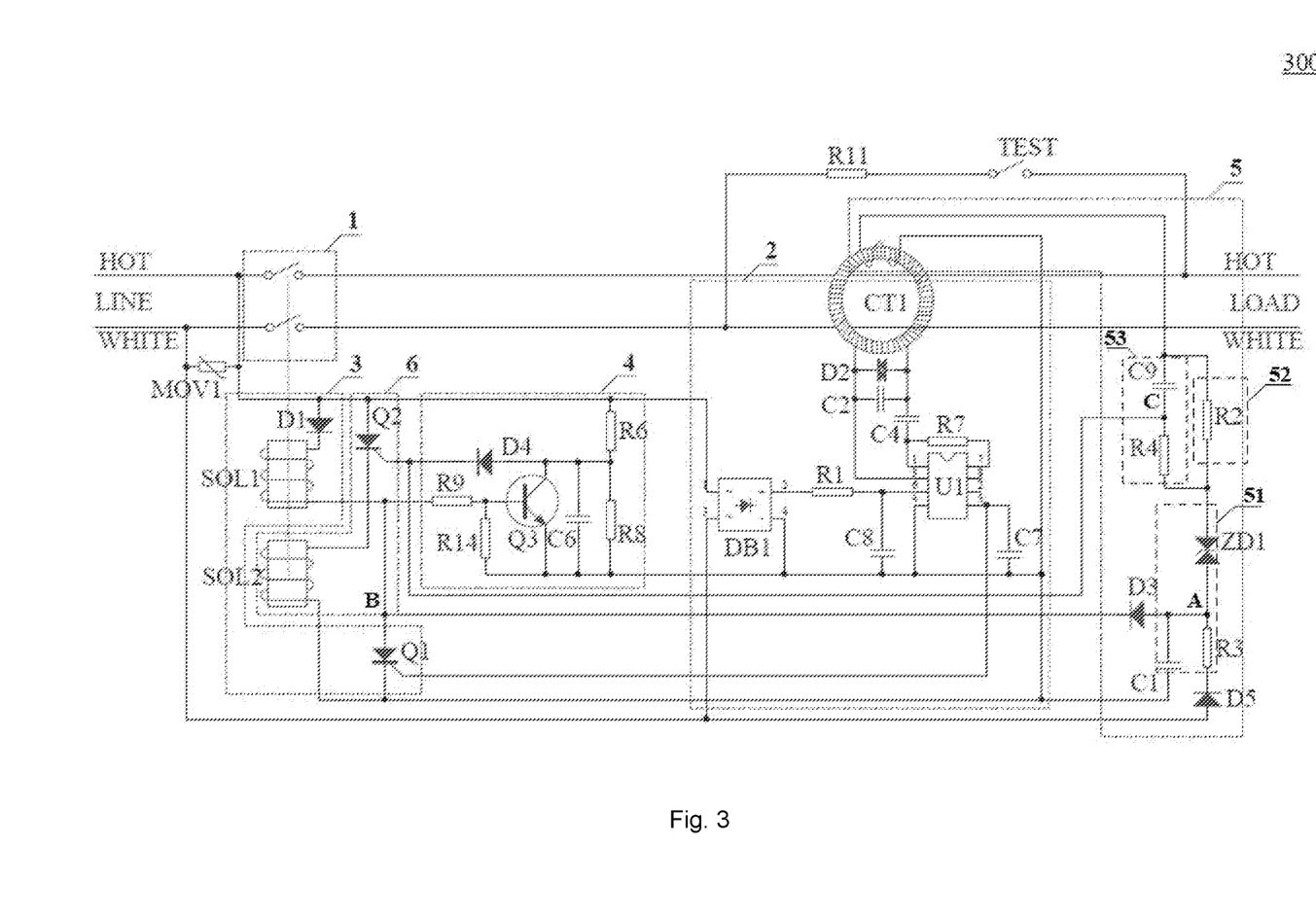
FIG. 3 is a circuit diagram of a leakage current detection and interruption device according to a first embodiment of the present invention.

FIG. 3 is a circuit diagram of a leakage current detection and interruption device according to a first embodiment of the present invention.

The leakage current detection and interruption device 300 is coupled between the input end LINE and the output end or load LOAD of the power supply lines. It includes a switch module 1, a leakage current detection module 2, a trip drive module 3, a coil function detection module 4, a self-test module 5 and a detection drive module 6. The switch module 1 is configured to electrically connect and disconnect the output end. The leakage current detection module 2 includes a leakage current detection coil CT1 through which the power supply lines pass, and a processor U1. The trip drive module 3 includes serial-coupled diode D1, solenoid SOL1 (the first coil), and transistor Q1 (the first semiconductor device).

When the leakage current detection and interruption device 300 performs its leakage current detection function, the switch in the switch module 1 is closed. When the currents flowing through the hot line HOT and neutral line WHITE are balanced, the leakage current detection coil CT1 does not generate a current imbalance. When the currents flowing through the hot line and neutral line are imbalanced, i.e., there is a leakage current, the leakage current detection coil CT1 generates a corresponding induced voltage. The leakage current detection coil CT1 is coupled to input pins (e.g., pins 1, 3 and 7) of the processor U1. When the output of the leakage current detection coil CT1 is higher than a threshold voltage, an output pin (e.g., pin 5) of the processor U1 outputs a high voltage level (i.e., the leakage current fault signal); otherwise it outputs a low voltage level. The high voltage level on the output pin (pin 5) of the processor U1 is provided to the control gate of the transistor Q1, which triggers transistor Q1 to become conductive. In turn, the current flowing through solenoid SOL1 is changed, which generates an electromagnetic force to drives the switch module 1 to disconnect the output end.

Still referring to FIG. 3, the coil function detection module 4 includes transistor Q3 (third semiconductor device), resistor R6 (first resistor), and diode D4. The detection drive module 6 includes serial-coupled transistor Q2 and solenoid SOL2. One end of resistor R6 is coupled to the hot line on the input end, and the other end of it is coupled to the collector of resistor Q3 and also coupled (along with the collector of resistor Q3) to the control gate of transistor Q2 via diode D4. The control electrode of transistor Q3 is coupled to solenoid SOL1 via a current-limiting resistor R9.

The self-test module 5 includes a simulated leakage current triggering module 51, a simulated leakage current generating module 52, and a fault signal generating module 53. The simulated leakage current triggering module 51 includes a trigger device ZD1, and serial-coupled resistor R3 (second resistor) and capacitor C1 (first capacitor). The trigger device ZD1 generates a simulated leakage current trigger signal when it is conductive. The trigger device may be any electronic device that can be triggered based on an input voltage. The point A between resistor R3 and capacitor C1 is coupled to the trigger device ZD1, and also coupled via diode D3 to the point B between solenoid SOL1 and transistor Q1. The simulated leakage current generating module 52 include resistor R2, which is coupled to the trigger device ZD1. The fault signal generating module 53 includes serial-coupled resistor R4 and capacitor C9, and the point C between them is coupled to the control electrode of transistor Q2. The neutral line charges capacitor C1 via diode D5 and resistor R3. When the voltage at the upper electrode of capacitor C1 (point A) reaches the trigger threshold voltage of the trigger device ZD1, the trigger device ZD1 becomes conductive, causing a current to flow via resistor R2 through the leakage current detection coil CT1, so that the leakage current detection coil CT1 generates a simulated leakage current signal. It should be understood that the simulated leakage current signal is actively generated by the leakage current detection module 2, for the purpose of simulating a leakage current signal that is generated when the power supply lines have a fault. Meanwhile, a current charges capacitor C9 via resistor R4.

In normal operation, the processor U1 detects the simulated leakage current signal, and outputs a high voltage level at the output pin 5, which triggers transistor Q1 to become conductive. This provides a discharge path for capacitor C1, thereby turning off the simulated leakage current trigger signal, i.e., the voltage at the upper electrode of capacitor C1 drops below the trigger threshold voltage of the trigger device ZD1, which turns off the trigger device ZD1.

Accordingly, a simulated leakage current is no longer generated at resistor R2. At this time, the hot line is in the other half cycle, so the solenoid SOL1 has no current following through it. Moreover, because the trigger device ZD1 stays conductive for a relative short time duration, the voltage at the lower electrode of capacitor C9 is insufficient to trigger transistor Q2 to conduct, so no current will flow through solenoid SOL2.

When the leakage current detection module 2 has a fault, the processor U1 cannot detect the simulated leakage current signal, and pin 5 does not output a high voltage level. Therefore, transistor Q1 is not triggered to conduct, i.e., it remains off. Or, when transistor Q1 has a fault, even if pin 5 of the processor U1 outputs a high voltage level, transistor Q1 does not become conductive. In both situations, transistor Q1 cannot provide a discharge path for capacitor C1, so the simulated leakage current trigger signal cannot be turned off. Thus, the trigger device ZD1 is in a continuously conductive state, and the simulated leakage current trigger signal continues to flow. As capacitor C9 is continuously charged, the voltage at its lower electrode continue to rise; when this voltage is sufficiently high to trigger transistor Q2 to conduct, the current through solenoid SOL2 changes, generating an electromagnetic force to drive the switch module 1 to disconnect the output end.

Meanwhile, when both solenoid SOL1 and diode D1 function normally, a current flows through diode D1, solenoid SOL1 and current-limiting resistor R9, so that transistor Q3 becomes conductive. At this time, the voltage at the collector of transistor Q3 is insufficient to trigger (via diode D4) transistor Q2 to conduct, so no current flows through solenoid SOL2. When solenoid SOL1 or diode D1 has a fault, current cannot flow through diode D1 and solenoid SOL1, and therefore cannot trigger transistor Q3, so transistor Q3 remains off. At this time, a current flows through resistor R6, and the voltage at the lower end of resistor R6 (the coil fault signal) triggers (via diode D4) transistor Q2 to conduct. As a result, the current through solenoid SOL2 changes, generating an electromagnetic force to drive the switch module 1 to disconnect the output end.

It should be pointed out that the faults in the switch module 1 may include, without limitation, the following conditions: an electronic component of the leakage current detection module 2 (e.g., leakage current detection coil CT1, resistor R1, etc.) has an open circuit or short circuit, the processor U1 is damaged, etc. The faults in solenoid SOL1, transistor Q1, and diode D1 may include, without limitation, damage or open circuit or short circuit of these components.

To summarize, in this embodiment, when any one or more of the leakage current detection module 2, transistor Q1 and solenoid SOL1 has a fault, transistor Q2 will be triggered to conduct, so that the current through solenoid SOL2 changes, generating an electromagnetic force to drive the switch module 1 to disconnect the output end.

Figure 4:
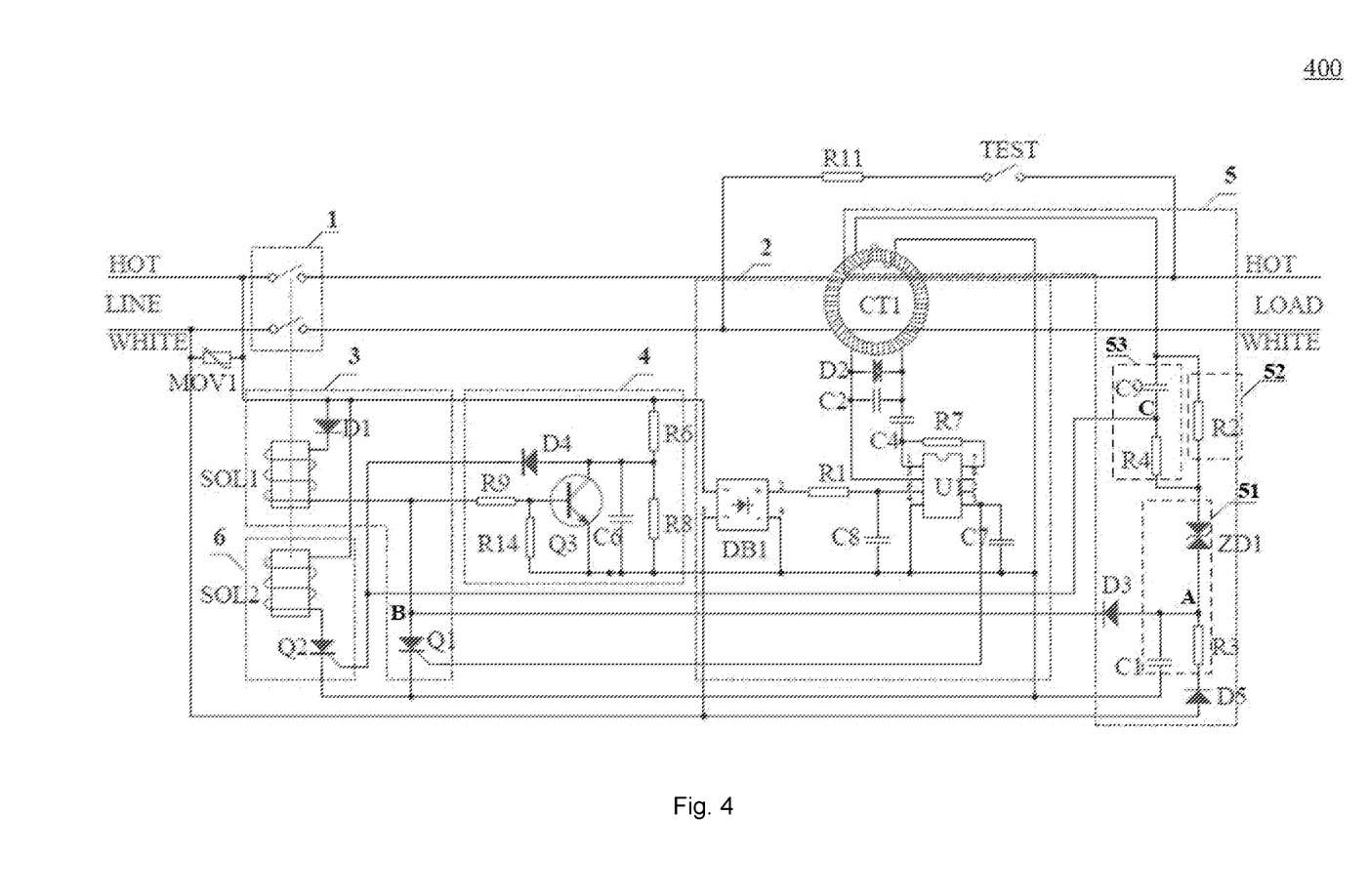
FIG. 4 is a circuit diagram of a leakage current detection and interruption device according to a second embodiment of the present invention.

FIG. 4 is a circuit diagram of a leakage current detection and interruption device according to a second embodiment of the present invention.

A main difference between the embodiment of FIG. 4 and the embodiment of FIG. 3 is that in FIG. 4, the transistor Q2 of detection drive module 6 is coupled to the lower end of solenoid SOL2. The leakage current detection and interruption device 400 shown in FIG. 4 is otherwise the same as and operates similarly to the leakage current detection and interruption device 300 shown in FIG. 3, and further descriptions are omitted.

Figure 5:
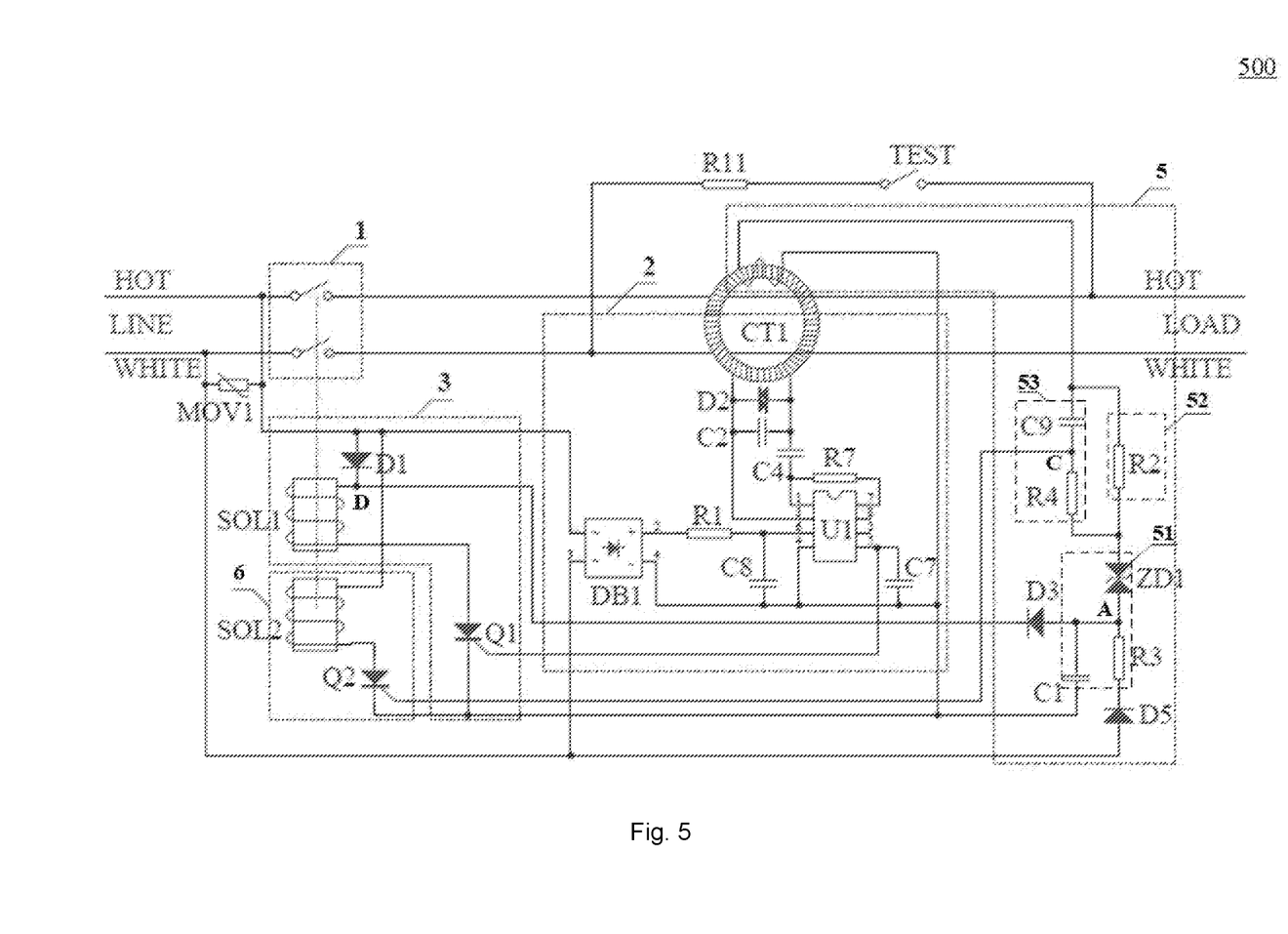
FIG. 5 is a circuit diagram of a leakage current detection and interruption device according to a third embodiment of the present invention.

FIG. 5 is a circuit diagram of a leakage current detection and interruption device according to a third embodiment of the present invention.

The leakage current detection and interruption device 500 in FIG. 5 includes a switch module 1, a leakage current detection module 2, a trip drive module 3, a self-test module 5, and a detection drive module 6. Similar to the embodiment of FIG. 4, the switch module 1 is configured to control the electrical connection in the power supply lines. The leakage current detection module 2 includes leakage current detection coil CT1 through which the power supply lines pass, and a processor U1. The trip drive module 3 includes serial-coupled diode D1, solenoid SOL1 (first coil), and transistor Q1 (first semiconductor device).

The leakage current detection principle of the leakage current detection and interruption device 500 is similar to that of the leakage current detection and interruption device 300 in FIG. 3, and further descriptions are omitted. The self-test module 5 includes a simulated leakage current triggering module 51, a simulated leakage current generating module 52, and a fault signal generating module 53. The simulated leakage current triggering module 51 includes a trigger device ZD1, and serial-coupled resistor R3 (second resistor) and capacitor C1 (first capacitor). The point A between resistor R3 and capacitor C1 is coupled to the trigger device ZD1, and also coupled via diode D3 to the point D between diode D1 and solenoid SOU. The simulated leakage current generating module 52 include resistor R2, which is coupled to the trigger device ZD1. The fault signal generating module 53 includes serial coupled resistor R4 and capacitor C9, and the point C between them is coupled to the control electrode of transistor Q2. The neutral line charges capacitor C1 via diode D5 and resistor R3. When the voltage at the upper electrode of capacitor C1 (point A) reaches the trigger threshold voltage of the trigger device ZD1, the trigger device ZD1 becomes conductive, causing a current to flow via resistor R2 through the leakage current detection coil CT1, so that the leakage current detection coil CT1 generates a simulated leakage current signal. Meanwhile, a current charges capacitor C9 via resistor R4.

In normal operation, the processor U1 detects the simulated leakage current signal, and outputs a high voltage level at the output pin 5, which triggers transistor Q1 to become conductive. Capacitor C1 is discharged through the discharge path formed by serial-coupled solenoid SOL1 and transistor Q1, thereby turning off the simulated leakage current trigger signal, i.e., the voltage at the upper electrode of capacitor C1 drops below the trigger threshold voltage of the trigger device ZD1, turning off trigger device ZD1. Accordingly, a simulated leakage current is no longer generated through resistor R2. At this time, the hot line is in the other half cycle, so the solenoid SOL1 has no current following through it. Moreover, because the trigger device ZD1 stays conductive for a relative short time duration, the voltage at the lower electrode of capacitor C9 is insufficient to trigger transistor Q2 to conduct, so no current will flow through solenoid SOL2.

When the leakage current detection module 2 has a fault, the processor U1 cannot detect the simulated leakage current signal, and pin 5 does not output a high voltage level. Therefore, transistor Q1 is not triggered to conduct, i.e., it remains off. Or, when transistor Q1 has a fault, even if pin 5 of the processor U1 outputs a high voltage level, transistor Q1 does not become conductive. Or, when solenoid SOL1 has a fault, even when transistor Q1 is conductive, capacitor C1 cannot be discharged. In these situations, a discharge path for capacitor C1 cannot be formed via serial-coupled diode D3, solenoid SOL1 and transistor Q1, so that the simulated leakage current trigger signal cannot be turned off. Thus, the trigger device ZD1 is in a continuously conductive state, and the simulated leakage current trigger signal continues to flow. As capacitor C9 is continuously charged, the voltage at its lower electrode continue to rise; when this voltage is sufficiently high to trigger transistor Q2 to conduct, the current through solenoid SOL2 changes, generating an electromagnetic force to drive the switch module 1 to disconnect the output end.

It should be pointed out that the faults in the switch module 1 may include, without limitation, the following conditions: an electrical component of the leakage current detection module 2 (e.g., leakage current detection coil CT1, resistor R1, etc.) has an open circuit or short circuit, the processor U1 is damaged, etc. The faults in solenoid SOL1 and transistor Q1 may include, without limitation, damage or open circuit or short circuit of these components.

To summarize, in this embodiment, when any one or more of the leakage current detection module 2, transistor Q1 and solenoid SOL1 has a fault, transistor Q2 will be triggered to conduct, so that the current through solenoid SOL2 changes, generating an electromagnetic force to drive the switch module 1 to disconnect the output end.

Figure 6:
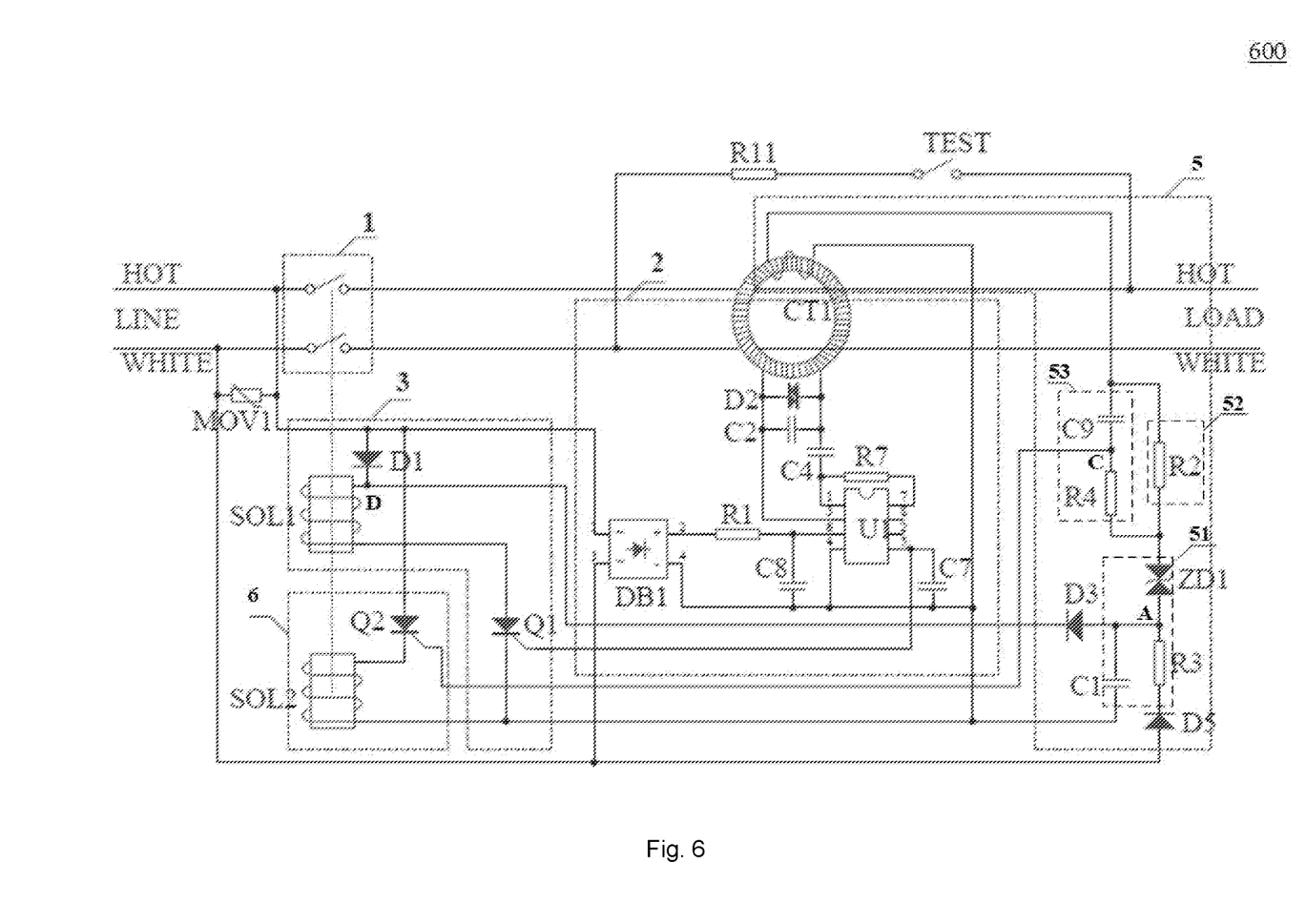
FIG. 6 is a circuit diagram of a leakage current detection and interruption device according to a fourth embodiment of the present invention.

FIG. 6 is a circuit diagram of a leakage current detection and interruption device according to a fourth embodiment of the present invention.

A main difference between the embodiment of FIG. 6 and the embodiment of FIG. 5 is that in FIG. 6, the transistor Q2 of detection drive module 6 is coupled to the upper end of solenoid SOL2. The leakage current detection and interruption device 600 shown in FIG. 6 is otherwise the same as and operates similarly to the leakage current detection and interruption device 500 shown in FIG. 5, and further descriptions are omitted.

In the above embodiments, the leakage current detection and interruption device can electrically disconnect the output end when the trip coil or semiconductor device of the main circuit has a fault, without user intervention, which enhances convenience and safety of the device.

While the above embodiments use transistors as examples, it should be understood that the transistors may be replaced by other types of semiconductor devices, such as photoelectric coupling elements, or any switching elements that respond to a control voltage.

Figure 7:
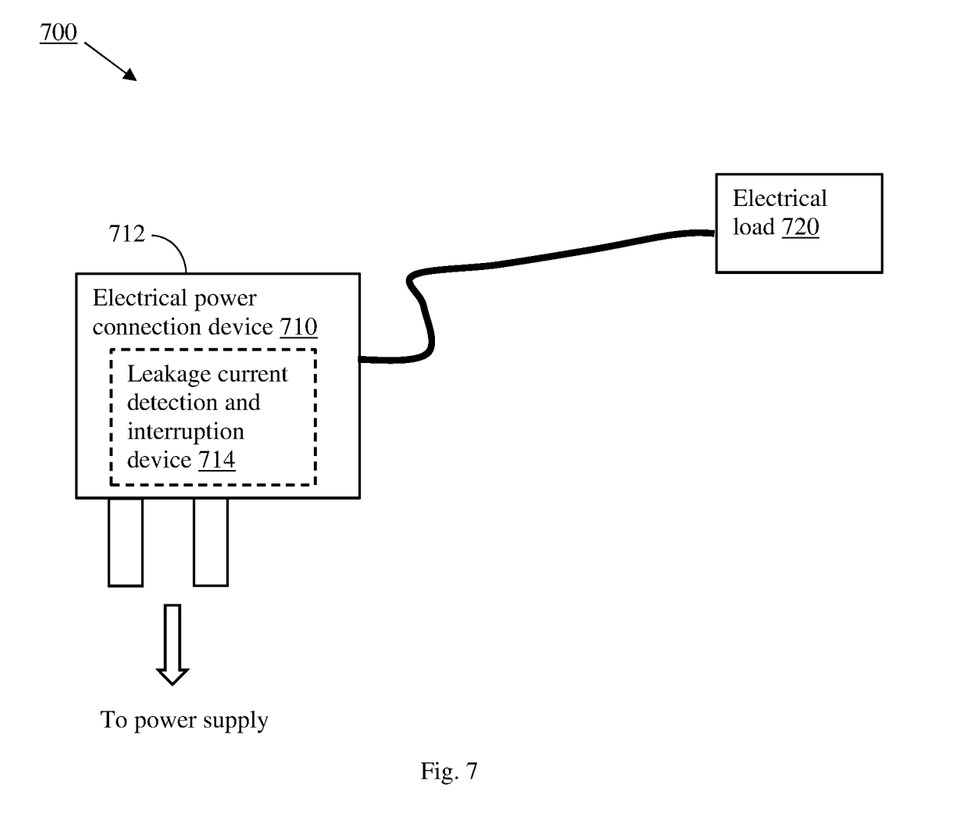
FIG. 7 schematically illustrates an electrical power connection device and an electrical appliance employing a leakage current detection and interruption device according to embodiments of the present invention.

As schematically illustrated in FIG. 7, additional embodiments of the present invention provide an electrical power connection device 710, which includes a body 712 and a leakage current detection and interruption device 714 according to any one of the above embodiments disposed inside the body.

Other additional embodiments of the present invention (see FIG. 7) provide an electrical appliance 700, which includes an electrical load 720, and an electrical power connection device 710 coupled between a power supply and the load 710 to supply power to the load, where the electrical power connection device employs a leakage current detection and interruption device according to any one of the above embodiments.

While the present invention is described above using specific examples, these examples are only illustrative and do not limit the scope of the invention. It will be apparent to those skilled in the art that various modifications, additions and deletions can be made to the leakage current detection and interruption device of the present invention without departing from the spirit or scope of the invention.

What is claimed is:

1. A leakage current detection and interruption device comprising:
    a switch module, coupled between an input end and an output end of a plurality of power supply lines, configured to control an electrical connection between the input end and the output end;

a leakage current detection module, configured to detect a leakage current on the plurality of power supply lines, and to generate a leakage current fault signal in response to detecting a leakage current;

a trip drive module, configured to drive the switch module to electrically disconnect the output end from the input end in response to the leakage current fault signal, the trip drive module including:
- a first coil, configured to generate an electromagnetic force to drive the switch module; and
- a first semiconductor device, coupled in series with the first coil, configured to cause the first coil to generate the electromagnetic force in response to the leakage current fault signal;

a coil function detection module, configured to detect a first fault condition in the first coil, and to generate a coil fault signal in response to detecting the first fault condition in the first coil;

a self-test module, configured to detect a second fault condition in the leakage current detection module and/or the first semiconductor device, and to generate a self-test fault signal in response to detecting the second fault condition; and a detection drive module, configured to drive the switch module to electrically disconnect the output end from the input end in response to the coil fault signal and/or the self-test fault signal.

2. The leakage current detection and interruption device of claim 1, wherein the detection drive module includes:
- a second coil, configured to generate another electromagnetic force to drive the switch module; and
- a second semiconductor device, coupled in series with the second coil, configured to cause the second coil to generate the another electromagnetic force in response to the coil fault signal or the self-test fault signal.

3. The leakage current detection and interruption device of claim 2, wherein each of the first semiconductor device and the second semiconductor device is selected from a group consisting of: silicon controlled rectifiers, bipolar junction transistors, field-effect transistors, and photoelectric coupling elements.

4. The leakage current detection and interruption device of claim 1, wherein the coil function detection module includes:
- a third semiconductor device, its control electrode being coupled to the first coil, and its first electrode being coupled to the detection drive module; and
- a first resistor, its one end being coupled to the input end of the power supply lines, its other end being coupled to the first electrode of the third semiconductor device;
- wherein when the first coil has the first fault condition, the coil function detection module generates the coil fault signal via the first resistor.

5. The leakage current detection and interruption device of claim 4, wherein each of the first semiconductor device and the third semiconductor device is selected from a group consisting of: silicon controlled rectifiers, bipolar junction transistors, field-effect transistors, and photoelectric coupling elements.

6. The leakage current detection and interruption device of claim 1, wherein the self-test module includes:
- a simulated leakage current triggering module, coupled to the first semiconductor device, configured to generate a simulated leakage current trigger signal, wherein the first semiconductor device is configured to turn off the simulated leakage current trigger signal in response to the leakage current fault signal;
- a simulated leakage current generating module, configured to generate a simulated leakage current signal in response to the simulated leakage current trigger signal; and
- a fault signal generating module, coupled to the simulated leakage current triggering module, configured to generate the self-test fault signal in response to the second fault condition in the leakage current detection module and/or the first semiconductor device.

7. The leakage current detection and interruption device of claim 6, wherein the simulated leakage current triggering module includes:
- a trigger device, configured to generate the simulated leakage current trigger signal when it is conductive; and
- a second resistor and a first capacitor, coupled in series and coupled to the trigger device, wherein the second resistor and the first capacitor are configured to control the trigger device to become conductive;
- wherein the first semiconductor device becomes conductive in response to the leakage current fault signal, and the first capacitor discharges via the first semiconductor device to turn off the simulated leakage current trigger signal.

8. An electrical power connection device, comprising:
a body; and
the leakage current detection and interruption device of claim 1, disposed inside the body.

9. An electrical appliance, comprising:
an electrical load; and
an electrical power connection device coupled between a power supply and the electrical load to supply power to the electrical load;
wherein the electrical power connection device includes the leakage current detection and interruption device of claim 1.

10. A leakage current detection and interruption device comprising:
a switch module, coupled between an input end and an output end of a plurality of power supply lines, configured to control an electrical connection between the input end and the output end;

a leakage current detection module, configured to detect a leakage current on the plurality of power supply lines, and to generate a leakage current fault signal in response to detecting a leakage current;

a trip drive module, configured to drive the switch module to electrically disconnect the output end from the input end in response to the leakage current fault signal, the trip drive module including:
- a first coil, configured to generate an electromagnetic force to drive the switch module; and
- a first semiconductor device, coupled in series with the first coil, configured to cause the first coil to generate the electromagnetic force in response to the leakage current fault signal;

a self-test module, configured to detect a fault condition in the leakage current detection module, the first coil, and/or the first semiconductor device, and to generate a self-test fault signal in response to detecting the fault condition; and a detection drive module, configured to drive the switch module to electrically disconnect the output end from the input end in response to the self-test fault signal.

11. The leakage current detection and interruption device of claim 10, wherein the detection drive module includes:

a second coil, configured to generate another electromagnetic force to drive the switch module; and a second semiconductor device, coupled in series with the second coil, configured to cause the second coil to generate the another electromagnetic force in response to the self-test fault signal.

12. The leakage current detection and interruption device of claim 11, wherein each of the first semiconductor device and the second semiconductor device is selected from a group consisting of: silicon controlled rectifiers, bipolar junction transistors, field-effect transistors, and photoelectric coupling elements.

13. The leakage current detection and interruption device of claim 10, wherein the self-test module includes:

a simulated leakage current triggering module, coupled to the first coil and the first semiconductor device, configured to generate a simulated leakage current trigger signal, wherein the first coil and the first semiconductor device are configured to turn off the simulated leakage current trigger signal in response to the leakage current fault signal;

a simulated leakage current generating module, configured to generate a simulated leakage current signal in response to the simulated leakage current trigger signal; and a fault signal generating module, coupled to the simulated leakage current triggering module, configured to generate the self-test fault signal in response to the fault condition in the leakage current detection module, the first coil, and/or the first semiconductor device.

14. The leakage current detection and interruption device of claim 13, wherein the simulated leakage current triggering module includes:

a trigger device, configured to generate the simulated leakage current trigger signal when it is conductive; and a second resistor and a first capacitor, coupled in series and coupled to the trigger device, wherein the second resistor and the first capacitor are configured to control the trigger device to become conductive;

wherein the first semiconductor device becomes conductive in response to the leakage current fault signal, and the first capacitor discharges via a path formed by the serial-coupled first coil and first semiconductor device to turn off the simulated leakage current trigger signal.

15. An electrical power connection device, comprising:

a body; and the leakage current detection and interruption device of claim 10, disposed inside the body.

16. An electrical appliance, comprising:

an electrical load; and an electrical power connection device coupled between a power supply and the electrical load to supply power to the electrical load;

wherein the electrical power connection device includes the leakage current detection and interruption device of claim 10.

* * * * *